United States Patent [19]

Abe et al.

[11] Patent Number: 5,164,350

[45] Date of Patent: Nov. 17, 1992

[54] CATALYST COMPOSITION FOR PURIFICATION OF EXHAUST GAS, CATALYST FOR PURIFICATION OF EXHAUST GAS, AND PROCESS FOR PRODUCING SAID CATALYST

[75] Inventors: Fumio Abe, Handa; Junichi Suzuki, Kuwana; Naomi Noda, Ichinomiya, all of Japan

[73] Assignee: NGK Insulators, Ltd., Japan

[21] Appl. No.: 646,363

[22] Filed: Jan. 28, 1991

[30] Foreign Application Priority Data

Nov. 9, 1990 [JP] Japan ................................. 2-305429

[51] Int. Cl.$^5$ ............................................. B01J 29/32
[52] U.S. Cl. ........................................ 502/66; 502/74
[58] Field of Search ................ 502/66, 74; 423/213.5

[56] References Cited

U.S. PATENT DOCUMENTS

| | | |
|---|---|---|
| 4,297,328 | 10/1981 | Ritscher et al. .................. 423/213.2 |
| 4,929,581 | 5/1990 | Steinwandel et al. ................. 502/2 |

FOREIGN PATENT DOCUMENTS

| | | |
|---|---|---|
| 20799 | 1/1981 | European Pat. Off. ......... 423/213.5 |
| 0427970A2 | 5/1991 | European Pat. Off. . |
| 1-135541 | 5/1989 | Japan . |
| 1-139144 | 5/1989 | Japan . |
| 2-56247 | 2/1990 | Japan . |
| 2-174937 | 7/1990 | Japan . |

OTHER PUBLICATIONS

Patent Abstracts of Japan, vol. 13, No. 394 (C-631)(3742) 31 Aug. 1989 & JP-A-1 139 144 (Toyota Motor Corp.) 31 May 1989.

Patent Abstracts of Japan, vol. 13, No. 372 (C-627)(3720) 17 Aug. 1989 & JP-A-1 127 044 (Toyota Central Res. & Dev.) 19 May 1989.

*Primary Examiner*—Carl F. Dees
*Attorney, Agent, or Firm*—Parkhurst, Wendel & Rossi

[57] ABSTRACT

A catalyst composition for purification of exhaust gas, including (a) high-silica zeolite having a Si/Al ratio of 40 or more, subjected to ion exchange with at least one metal selected from Pt, Pd, Rh, Ir and Ru, and (b) a heat-resistant oxide containing at least one metal selected from Pt, Pd, Rh, Ir and Ru; a catalyst for purification of exhaust gas, including a monolith carrier and the catalyst composition supported on the carrier; and a process for producing the catalyst. The catalyst has high activity for exhaust gas purification even when the catalyst contains Rh--, --, which is an expensive catalyst component, in a very small amount.

16 Claims, No Drawings

CATALYST COMPOSITION FOR PURIFICATION OF EXHAUST GAS, CATALYST FOR PURIFICATION OF EXHAUST GAS, AND PROCESS FOR PRODUCING SAID CATALYST

BACKGROUND OF THE INVENTION

The present invention relates to a catalyst composition for purification of exhaust gas, a catalyst for purification of exhaust gas and a process for producing the catalyst. The present invention relates mainly to a three-way catalyst for purification of exhaust gas emitted from internal combustion engines of automobiles.

Various types of catalysts for purification of exhaust gas emitted from internal combustion engines have hitherto been proposed. For example, Japanese Patent Application Laid-Open No. 135541/1989 proposes a zeolite catalyst subjected to ion exchange with a noble metal such as Pt, Pd - - -, - - -; for purification of $NO_x$ at a high conversion efficiency even for an exhaust gas generated under a large air-to-fuel ratio (A/F) (a fuel-lean mixture). Japanese Patent Application Laid-Open No. 139144/1989 proposes, also as a catalyst for purification of exhaust gas emitted from lean burn engines, a catalyst which is a mixture of (1) a reduction catalyst wherein zeolite is subjected to ion exchange with a transition metal and (2) an oxidation catalyst comprising alumina and a noble metal catalyst component supported thereon.

Japanese Patent Application Laid-Open No. 56247/1990 proposes, for purification of hydrocarbons at a high conversion efficiency particularly at cold start, a three-way catalyst consisting of a first layer comprising, as a main component, zeolite supported on a carrier and a second layer comprising, as a main component, a noble metal such as Pt, Pd, Rh. Japanese Patent Application Laid-Open No. 174937/1990 proposes a three-way catalyst consisting of molecular sieves and a noble metal, developed for the purpose of reducing the amount of expensive Rh.

However, in the catalysts proposed in Japanese Patent Application Laid-Open Nos. 135541/1989, 139144/1989 and 56247/1990 all employing, as the catalyst component, a noble metal supported on zeolite, no study has been made on the effect which Si/Al ratio of zeolite has on catalytic activity; therefore, some of those catalysts have insufficient heat resistance and do not function sufficiently as a catalyst for exhaust gas purification. The activity depends upon the level of Si/Al ratio. Moreover, in the catalyst proposed by Japanese Patent Application Laid-Open No. 56247/1990 wherein hydrocarbons are adsorbed by the inner zeolite layer at cold start and, after warm-up, are desorbed, oxidized and thereby made nontoxic, the outer layer becomes a hindrance to the mass transfer of substances, making it difficult to obtain an intended effect sufficiently.

In the catalyst proposed by Japanese Patent Application Laid-Open No. 174937/1990 employing various zeolites as a three-way catalyst, the noble metal is not sufficiently supported on any of these zeolites, making it impossible to obtain a sufficient catalytic activity for exhaust gas purification.

SUMMARY OF THE INVENTION

It is an object of the present invention to provide a three-way catalyst having sufficient heat resistance and possessing high activity for purification of such exhaust gas components as $NO_x$, CO and hydrocarbons. It is another object of the present invention to provide a three-way catalyst for exhaust gas purification, which has a sufficient activity for exhaust gas purification even when the amount of expensive Rh component supported on carrier is reduced to a level smaller than the ratio (1/11 to 1/19) of Rh/Pt in natural ores and optionally the amount is reduced even to zero (Rh has been considered as an essential catalyst component).

According to the present invention, there is provided a catalyst composition for purification of exhaust gas, comprising (a) a high-silica zeolite having a Si/Al ratio of 40 or more, subjected to ion exchange with at least one metal selected from Pt, Pd, Rh, Ir and Ru, and (b) a heat-resistant oxide containing at least one metal selected from Pt, Pd, Rh, Ir and Ru.

The present invention also provides a catalyst for exhaust gas purification, comprising a monolith carrier and the above catalyst composition for exhaust gas purification supported on the monolith carrier.

The present invention also provides various processes for producing the above catalyst for exhaust gas purification. As a first process, there is provided a process for producing a catalyst for purification of exhaust gas, which comprises coating a monolith carrier with a slurry comprising a high-silica zeolite having a Si/Al ratio of 40 or more, subjected to ion exchange with at least one metal selected from Pt, Pd, Rh, Ir and Ru and a heat-resistant oxide or its precursor, drying and/or firing the slurry/coated monolith carrier, impregnating the resulting monolith carrier with a solution containing at least one metal selected from Pt, Pd, Rh, Ir and Ru, and drying or/and firing the impregnated monolith carrier.

As a second process, there is provided a process for producing a catalyst for purification of exhaust gas, which comprises coating a monolith carrier with a slurry comprising a high-silica zeolite having a Si/Al ratio of 40 or more, subjected to ion exchange with at least one metal selected from Pt, Pd, Rh, Ir and Ru and a heat-resistant oxide or its precursor containing at least one metal selected from Pt, Pd, Rh, Ir and Ru, and drying and/or firing the slurry-coated monolith carrier.

As a third process, there is provided a process for producing a catalyst for purification of exhaust gas, which comprises conducting at least once a series of steps consisting of (1) a first slurry-adhering step wherein a monolith carrier is coated with a slurry comprising a high-silica zeolite having a Si/Al ratio of 40 or more, or its precursor, (2) an ion exchange step wherein the monolith carrier after the first slurry-coating step is dried and/or fired, or hydrothermal synthesis and dried and/or fired, and then contacted with a solution containing at least one metal selected from Pt, Pd, Rh, Ir and Ru to subject the high-silica zeolite to ion exchange with said metal, (3) a second slurry-coating step wherein the monolith carrier after the ion exchange step is coated with a slurry comprising a heat-resistant oxide or its precursor, and (4) a metal-supporting step wherein the monolith carrier after the second slurry-coating step is dried and/or fired and then impregnated with a solution containing at least one metal selected from Pt, Pd, Rh, Ir and Ru, to allow said metal to be supported on the monolith carrier, and then drying and/or firing the resulting catalyst.

As a fourth process, there is provided a process for producing a catalyst for purification of exhaust gas, which comprises conducting at least once a treatment consisting of (1) a step wherein a monolith carrier is coated with a slurry comprising a heat-resistant oxide or its precursor, the slurry-coated monolith carrier is dried and/or fired and then impregnated with a solution containing at least one metal selected from Pt, Pd, Rh, Ir and Ru, and the impregnated monolith carrier is dried and/or fired, or wherein a monolith carrier is coated with a slurry comprising a heat-resistant oxide or its precursor containing at least one metal selected from Pt, Pd, Rh, Ir and Ru, and the slurry-coated monolith carrier is dried or/and fired, and (2) a step wherein the resulting monolith carrier is coated with a slurry comprising a high-silica zeolite having a Si/Al ratio of 40 or more, subjected to ion exchange with at least one metal selected from Pt, Pd, Rh, Ir and Ru, and the slurry-coated monolith carrier is dried or/and fired.

The catalyst and catalyst composition for exhaust gas purification according to the present invention contain, as a catalyst component, a high-silica zeolite having a Si/Al ratio of 40 or more, subjected to ion exchange with platinum group metal(s), and accordingly are excellent in catalytic activity, durability and heat resistance as well as in purification ability for hydrocarbons in an exhaust gas generated under a small air-to-fuel ratio (a fuel-rich mixture). Further, the present catalyst and catalyst composition do not yield much by-product, particularly $NH_3$ although they contain a small amount of expensive Rh, and show high activity. Furthermore, they can be produced simply and easily and are useful in industry.

DETAILED DESCRIPTION OF THE INVENTION

The present invention is hereinafter described in more detail.

The high-silica zeolite as the component (a) of the present invention is typically, like well known ordinary zeolite, a crystalline aluminosilicate having a three-dimensional network structure formed by tetrahedrons of Si atoms partially replaced by Al atoms, via oxygen atoms and, in order to compensate the imperfection of positive charges in the alumina regular tetrahedrons, usually contains cations such as Na. The high-silica zeolite of the present invention has a high Si/Al ratio (atomic ratio) of about 10 to 1,000 or more, as compared with the Si/Al ratio of 1-5 of ordinary zeolite. In the present invention, it is preferable that the high-silica zeolite has a Si/Al ratio of 40-1,000 and the cation such as Na or the like is preferably protonic (H type).

The high-silica zeolite having a Si/Al ratio of 40 or more has increased heat resistance, making the resulting catalyst of the present invention usable in more severe conditions, is more useful, and has higher purification activity for exhaust gas. Further, such zeolite has increased hydrophobicity, has higher adsorbability for CO, hydrocarbons and $NO_x$ (these are components to be purified) in exhaust gas than for the moisture in the same exhaust gas, and can give higher purification ratios for CO, hydrocarbons and $NO_x$. Furthermore, the zeolite creates hydrocarbon species advantageous to exhaust gas purification, owing to the strong solid acid of high-silica zeolite and shows very high purification ability for hydrocarbons generated under a small air-to-fuel ratio (a fuel-rich mixture).

When the Si/Al ratio of zeolite is less than 40, the crystal structure of zeolite is destroyed at high exhaust gas temperatures of about 400°-800° C. When the Si/Al ratio is more than 1,000, the number of sites at which ion exchange takes place, is small, only small amount(s) of catalyst metal(s) are introduced by ion exchange, and accordingly it is difficult to obtain desired catalytic activity. The use of high-silica zeolite of Na type at high temperatures is not preferable, in comparison with high-silica zeolite of H type, because the crystal structure of the former zeolite is destroyed at temperatures of 800° C. or higher.

As the high-silica zeolite of the present invention, there can be used synthetic zeolite including those commercially available such as ZSM-5 of Mobil and Silicalite of UOP. The high-silica zeolite of the present invention can also be used in a form obtained by subjecting zeolite such as X type, mordenite to a dealumination treatment to remove aluminum from the zeolite skeleton and thereby increase the Si/Al ratio. There can also be used a metalloaluminosilicate obtained by incorporating rare earth metal(s) or base metal(s) into a zeolite skeleton.

The component (a) of the present invention can be obtained by subjecting the above zeolite to ion exchange with at least one metal selected from platinum group metals consisting of Pt, Pd, Rh, Ir and Ru (hereinafter referred to simply as platinum group metals) in an appropriate aqueous solution. In the high-silica zeolite subjected to ion exchange with platinum group metal(s), the cation of metal M (the cation includes proton) in the cage of zeolite has been ion-exchanged with the platinum group metal(s). In the present invention, the ion exchange efficiency is preferably about 10% or more. When the ion exchange efficiency is less than 10%, the resulting catalsyt has no sufficient catalytic activity. The ion exchange efficiency can be controlled at a desired level by appropriately selecting the pH and concentration of the aqueous solution used in ion exchange, the type(s) of platinum group metal-containing compound(s), and so forth.

In the present invention, ion exchange efficiency is defined as following formula, wherein each of valances of Pt and Pd is 2 and valance of Rh is 3.

Ion exchange efficiency (%) =

$$\frac{\frac{\text{ion-exchanged noble metal ion}}{\text{valance of noble metal}}}{\text{number of site of ion exchanger}} \times 100$$

The platinum group metal(s) introduced into the high-silica zeolite by ion exchange is (are) located at the exchange sites of the zeolite in a uniform dispersion and can exhibit the catalytic activity effectively, is (are) resistant to vaporization, causes (cause) no agglomeration even at high temperatures, and can maintain a high activity over a long period of time. Meanwhile in a zeolite loaded with platinum group metal(s) according to ordinary impregnation, the metal(s) is (are) loaded mainly in the micropores of the zeolite; accordingly, the interaction between zeolite and platinum group metal(s) is weak, the uniformity in dispersion is low, the agglomeration of the metal(s) takes place easily, and the catalyst obtained has low catalytic activity. Thus, the platinum group metal loading by ion exchange in the present invention gives excellent results. In the present invention, the component (a) can be further loaded with platinum group metal(s) by impregnation, if necessary, in addition to the loading of platinum group metal(s) by ion exchange. The component (a) can be furthermore loaded with transition metal(s) such as Cu, Ni, Fe, Cr, Co, Mn, Ag, Re. In loading with these transition metals, the amount of expensive platinum group metal(s) loaded can be reduced.

In the component (a), the type(s), etc. of the platinum group metal(s) used in ion exchange are not particularly restricted. However, it is preferable to use expensive Rh, in particular, in ion exchange, as a catalyst metal component in the catalyst composition and catalyst of the present invention. In general, Rh as a platinum group metal which is believed to be essential in a three-way catalyst for selective purification of $NO_x$, interacts strongly with $\gamma$-$Al_2O_3$ (ordinarily used in a catalyst for exhaust gas purification) in an oxidizing atmosphere, causing the deactivation of catalyst. In the present invention, however, the Rh introduced into high-silica zeolite by ion exchange can maintain its high activity at high temperatures over a long period of time; as a result, the catalyst of the present invention has high durability and is very useful in industry.

The high-silica zeolite as the component (a), subjected to ion exchange with platinum group metal(s) can be loaded further with about 2-35% by weight in total of rare earth element (compound) oxide(s) (e.g. $CeO_2$, $La_2O_3$) having oxygen storage capacity [the rare earth element (compound) oxide(s) refers (refer) to rare earth element oxide(s) and/or rare earth element compound oxide(s), and the same applies hereinafter] and/or, in order to impart heat resistance, alkaline earth metal (compound) oxide(s) [the alkaline earth metal (compound) oxide(s) refers (refer) to alkaline earth metal oxide(s) and/or alkaline earth metal compound oxide(s), and the same applies hereinafter]. The addition of these oxides results in increased three-way catalytic performance (increased window) and increased heat resistance and widens the application range of the present catalyst. When the amount of the above oxides added is less than 2% by weight, the above effects cannot be expressed sufficiently. When the amount is more than 35% by weight, the unique catalytic effect of zeolite is impaired. The above oxides such as $CeO_2$, $La_2O_3$ can be incorporated by an ordinary method.

It is also possible to add, at the time of preparation of a coating slurry to coat a carrier therewith, a small amount, for example, 2-20% by weight of a heat-resistant oxide (e.g. $Al_2O_3$, $Al_2O_3$-$SiO_2$) as a binder.

Next, description is made on the component (b) of the present invention.

The heat-resistant oxide of the component (b) of the present invention is at least one oxide appropriately selected from the group consisting of $Al_2O_3$, $TiO_2$, $ZrO_2$, $SiO_2$, their compound oxides, and oxides obtained by adding to one of said oxides 2-35% by weight of a rare earth element (compound) oxide or/and an alkaline earth metal (compound) oxide, that is, the group consisting of $Al_2O_3$, $TiO_2$, $ZrO_2$ and $SiO_2$ oxides, compound oxides containing at least two elements selected from Al, Ti, Zr and Si, oxides obtained by adding to one of said oxides 2-35% by weight of a rare earth element (compound) oxide or an alkaline earth metal (compound) oxide, oxides obtained by adding to one of said compound oxides 2-35% by weight of a rare earth element (compound) oxide or an alkaline earth metal (compound) oxide, oxides obtained by adding to one of $Al_2O_3$, $TiO_2$, $ZrO_2$ and $SiO_2$ oxides 2-35% by weight of a rare earth element (compound) oxide and an alkaline earth metal (compound) oxide, and oxides obtained by adding to one of compound oxides containing at least two elements selected from Al, Ti, Zr and Si, 2-35% by weight of a rare earth element (compound) oxide and an alkaline earth metal (compound) oxide.

In the present invention, by mixing the component (b) with the component (a), the unique catalytic effect of the high-silica zeolite [the component (a)] can be increased and further the three-way catalytic performance, particularly the light-off performance of the component (a) can be improved. When the total amount of the rare earth element(s) and the alkaline earth metal(s) added is less than 2% by weight, the properties described later cannot be expressed sufficiently. When the amount is more than 35% by weight, the improvement in light-off performance is impaired. The addition of alkaline earth metal oxide(s), for example, BaO improves the heat-resistance of $Al_2O_3$; the addition of rare earth element oxide(s), for example, $CeO_2$ widens the three-way catalytic performance. There is preferably used $\gamma$-$Al_2O_3$ as an oxide, or, as a compound oxide, $\gamma$-$Al_2O_3$-$CeO_2$, $\gamma$-$Al_2O_3$$La_2O_3$, or $\gamma$-$Al_2O_3$-$La_2O_3$-$CeO_2$.

The component (b) of the present invention can be produced by loading the above-mentioned heat-resistant oxide with at least one of the above-mentioned platinum group metals. The content of the platinum group metal(s) in the component (b) can be appropriate, depending upon the amount of the platinum group metal(s) introduced into the component (a) by ion exchange; however, it is preferably at least about equal to the amount of the platinum group metal(s) introduced into the component (a) by ion exchange, in order to obtain improved light-off performance.

In the catalyst composition and catalyst of the present invention, the types of the platinum group metals present in the component (a) and the component (b) may be the same or different. Preferably, the component (a) and the component (b) are produced so as to contain different platinum group metals. Particularly preferably, Rh is allowed to be present in the high-silica zeolite by ion exchange; and Pd or Pt which easily forms an alloy with Rh, is allowed to be present in the heat-resistant oxide.

Also in the catalyst composition and catalyst of the present invention, the amount of the platinum group metal(s) introduced into the component (a) by ion exchange and the amount of the platinum group metal(s) contained in the component (b), that is, the total amount of the platinum group metal(s) contained in the catalyst is, in the case of, for example, a monolith carrier catalyst, preferably 10-60 g/ft$^3$ (0.35-2.11 g/l), more preferably 10-35 g/ft$^3$ (0.35-1.24 g/l), most preferably 15-30 g/ft$^3$ (0.53-1.06 g/l). With the above amount of the platinum group metal(s) loaded, the catalyst composition of the present invention can effectively function as a catalyst for exhaust gas purification and, moreover, has excellent durability. The reason is that, as mentioned above, the platinum group metal(s) is (are) loaded at high uniformity on the high-silica zeolite by ion exchange. When the total amount of the platinum group metal(s) loaded is less than 10 g/ft$^3$ (0.35 g/l), the resulting catalyst for exhaust gas purification is insufficient in light-off performance and durability. The amount larger than 60 g/ft$^3$ (2.11 g/l), or larger than 35 g/ft$^3$ (1.24 g/l) when Rh and/or Pt is loaded, is not preferable from the cost standpoint. Loading in an amount of 15-30 g/ft$^3$ (0.53-1.06 g/l) is preferable industrially from the cost standpoint. In the conventional catalysts for exhaust gas purification, it has been necessary to load Rh which is most expensive of the platinum group metals, in an amount of at least 5 g/ft³ (0.18 g/l). Meanwhile, in the catalyst of the present invention, Rh loading in an amount of less than 5 g/ft³ (0.18 g/l) can sufficiently perform selective reduction of $NO_x$ to $N_2$, and further the loading even in an amount of 0-2 g/ft³ (0-0.07 g/l) can exhibit practically sufficient selectivity when the resulting catalyst is used under relatively mild conditions (e.g. such conditions as the content of poisoning material in exhaust gas is low). Thus, the amount of Rh loaded can be appropriately selected depending upon, for example, the application conditions of catalyst and, as compared with the level in conventional catalysts, can be reduced; therefore, the amount of Rh can be reduced down to the Rh/Pt ratio in mining which ranges, for example, from 1/11 to 1/19 depending upon the vein.

The weight ratio of the component (a) and the component (b) in the catalyst composition of the present invention is preferably the component (a): the component (b)=10:90 to 85:15. When the content of the component (a) is less than 10% by weight, it is impossible to obtain the unique properties of the zeolite subjected to ion exchange with platinum group metal(s), particularly the reduction in amount of $NH_3$ generated. When the content of the component (a) is more than 85% by weight, the resulting catalyst has poor light-off performance.

The catalyst composition of the present invention comprises the component (a), i.e., a high-silica zeolite whose cation (e.g., $H^+$) has been ion-exchanged with at least one of platinum group metals (Pt, Pd, Rh, Ir and Ru) and the component (b), i.e., a heat-resistant oxide (e.g., $Al_2O_3$, $TiO_2$) containing at least one of platinum group metals (Pt, Pd, Rh, Ir and Ru). The catalyst composition can be used as a catalyst for exhaust gas purification, by itself in a form such as pellets. Also, the catalyst composition is made into a catalyst by loading the component (a) and the component (b) of the composition preferably on a monolith carrier of honeycomb structure according to one of various methods.

The form in which the catalyst composition of the present invention is used, can be appropriately selected, depending upon its application purpose and application conditions.

The monolith carrier of the present invention is a so-called honeycomb structure having passages surrounded by substantially uniform walls. As the materials for the monolith carrier, there are preferably used ceramics such as cordierite, mullite; foil-shaped metals consisting of heat-resistant stainless steel such as Fe-Cr-Al alloy; and metals shaped into a honeycomb structure by means of powder metallurgy.

The shape of pores of the honeycomb carrier may be any, for example, polygonal (e.g., square, triangular), corrugated, etc. The honeycomb carrier can be produced so as to have a desired external shape which fits into the internal shape of the exhaust gas system in which the honeycomb carrier is to be installed.

In the catalyst of the present invention, when the honeycomb carrier is coated with the component (a) and the component (b) to form a film, the film thickness is preferably 10-100 μm. When the film thickness is less than 10 μm, the resulting catalyst has insufficient durability. When the film thickness is more than 100 μm, the resulting catalyst produces high pressure loss. Usually, onto a honeycomb structure having square cells, a cell density of 400 cpi² (62 cells/cm²) and a cell thickness of 6 mil (150 μm) is supported the catalyst composition of the present invention in an amount of 10-60% by weight (35-230 g/l) based on the unit weight (volume) of the carrier.

In the catalyst of the present invention, the component (a) and the component (b) supported on the monolith carrier may take a form of mixture, or a form of respective layers with one of them being a surface layer. The form of two components on the monolith carrier can be appropriately determined in view of the nature of exhaust gas (e.g., concentrations of component gases), the purification conditions, the types and amounts of metals in the components (a) and (b), etc.

For example, in order to remove $NO_x$ at a high purification ratio, it is preferable that the component (a) containing Rh as a result of ion exchange form a surface layer; and in order to remove hydrocarbons at a high purification ratio, it is preferable that the components (a) and (b) take a form of mixture or the component (a) form a surface layer. When the deposition of toxic substances such as heavy metals is a main purpose, it is preferable that the component (a) or (b) containing Pt form a surface layer.

In the present invention, the component (a), i.e., the high-silica zeolite subjected to ion exchange with platinum group metal(s) can be produced by immersing a zeolite having a Si/Al ratio of 40 or more in a solution containing $10^{-4}$ to $10^{-1}$ mol/l of cations of platinum group metal(s), allowing the system to stand, be stirred or be flowed back at normal temperature to 100° C., preferably 80°-90° C. for at least about 2 hours to effect ion exchange with platinum group metal(s), repeating, if necessary, filtration and water washing to remove metals other than the platinum group metal(s) introduced into the zeolite by ion exchange, drying the resulting zeolite usually at 80°-150° C., and firing the dried zeolite in an oxidizing or reducing atmosphere at 300°-1,000° C. for about 1-10 hours. The firing at a temperature higher than 1,000° C. is not preferable because it causes agglomeration of platinum group metal(s). This, however, indicates that the component (a) of the present invention has very high durability, in view of the fact that the agglomeration of platinum group metal(s) is caused by the firing at a temperature of 800° C. or higher in the conventional counterpart.

As mentioned above, in the catalyst of the present invention, the component (a) and the component (b) can be supported on the honeycomb carrier in a mixture form or in respective layers.

The production of the catalyst of the present invention can be effected generally by, for example, applying a slurry (slurries) of the component (a) or (and) the component (b) to the carrier by spray coating or dipping the carrier in said slurry (slurries). Also in this case, the component (a) and the component (b) can be loaded on the carrier in a mixture state or in respective layers. The catalyst is produced specifically as follows.

When the Component (a) and the Component (b) are Loaded on the Monolith Carrier in a Mixture Form At first, there is prepared a slurry suitable for washcoat of desired composition, by mixing the component (a), i.e., the high-silica zeolite subjected to ion exchange with a platinum group metal, a heat-resistant oxide (e.g., γ-$Al_2O_3$ and $CeO_2$ or their precursors) and, if necessary, an inorganic binder (e.g., alumina sol), a peptizer and an organic binder. Next, a monolith carrier is dipped in the slurry to adhere the slurry to the carrier in a desired film thickness; the resulting monolith carrier is dried at, for example, 100° C. and fired; the resulting monolith carrier is impregnated with a cationic or anionic solution containing a desired concentration of a platinum group metal, followed by drying and firing in the same manner as above. In the above impregnation, the most part of the platinum group metal is loaded onto the hydrophilic heat-resistant oxide because the high-silica zeolite is hydrophobic and its exchange sites have been occupied by the platinum group metal by ion exchange.

Alternatively, for example, a powder of $\gamma$-$Al_2O_3$-$CeO_2$ system is impregnated with a desired amount of a platinum group metal; the resulting powder is dried and fired in the same manner as above to prepare a heat-resistant oxide containing a platinum group metal; the heat-resistant oxide containing a platinum group metal is mixed with a high-silica zeolite subjected to ion exchange with a platinum group metal, prepared in the same manner as above, to prepare a slurry suitable for washcoat in the same manner as above; and the subsequent procedure as above is conducted to obtain a catalyst. This catalyst is superior in durability.

When plural platinum group metals are loaded, they can be loaded individually or simultaneously by the above ion exchange method and the impregnation method.

It is also possible to load a mixture of the component (a) and the component (b) on the monolith carrier more than once to form on the monolith carrier plural layers of a mixture of the component (a) and the component (b), each layer containing a different platinum group metal.

When the Component (a) and the Component (b) are Loaded on the Monolith Carrier in Respective Layers In the same way as the above case of mixture loading, slurries of the component (a) and the component (b) are prepared individually; the slurries are applied on the monolith carrier so as to form respective layers in a given order. When the component (a) layer is formed on the monolith carrier as a first layer, it is possible that a slurry of a high-silica zeolite or its precursor be prepared in place of a slurry of the ion-exchanged high-silica zeolite, the slurry be applied to a monolith carrier and then subjected to drying for the high-silica zeolite or hydrothermal synthesis and drying for the zeolite precursor, followed by firing, and the resulting one be subjected to ion exchange with platinum group metal(s).

In the above loading method, each of the component (a) layer and the component (b) layer can be formed in a multilayer by repeating the above procedure.

The method for producing catalyst can be selected depending on desired catalyst forms.

The present invention is hereinafter described in more detail by way of Examples. However, the present invention is in no way restricted to the following Examples.

EXAMPLE 1

Selection of Zeolite

As the zeolite constituting the component (a) of the present invention, there were used mordenite zeolite A of H type, ZSM-5 zeolites B to E of H type, zeolite F obtained by subjecting the above zeolite A to boiling with hydrochloric acid to increase the Si/Al ratio, and ZSM-5 zeolite G of Na type, all of which were commercially available and had different Si/Al ratios as shown in Table 1. Incidentally, zeolite G had an alkaline earth metal content of 0.85% by weight and other zeolites had an alkaline earth metal content of 0.1% by weight or less.

The BET specific surface areas ($m^2/g$) of the above zeolites measured at normal temperature and after heat treatment at 900° C., 1,000° C. and 1,100° C. in an electric furnace for 5 hours, are shown in Table 1.

TABLE 1

| Kind of zeolite | Si/Al Atomic ratio | Normal temp. | Heat treatment temp. (°C.) | | |
|---|---|---|---|---|---|
| | | | 900 | 1000 | 1100 |
| | | BET specific surface area ($m^2/g$) | | | |
| A | 14 | 360 | 120 | 30 | <1 |
| B | 48 | 410 | 400 | 300 | 30 |
| C | 130 | 415 | 410 | 300 | 285 |
| D | 215 | 405 | 405 | 360 | 320 |
| E | 500 | 400 | 400 | 360 | 350 |
| F | 50 | 400 | 400 | 310 | 45 |
| G | 200 | 350 | 30 | 5 | <1 |

As is clear from Table 1, the heat resistance of zeolite is dependent upon its Si/Al ratio, and a zeolite having a Si/Al ratio of larger than 40 is required in view of that the highest temperature to which a catalyst for automobile exhaust gas purification is exposed is generally 1,000° C. and that the catalyst should maintain its high specific surface area even at 1,000° C.

Zeolite G has a decreased specific surface area as a result of heat treatment although it is high-silica zeolite having a Si/Al ratio of 200. The reason is presumed to be that it is a Na type. Accordingly, it is appreciated that zeolite of H type must be used in the present invention and, when zeolite of Na type is used, it must be converted to a H type after having been ion-exchanged with platinum group metal(s).

Preparation of Catalyst Composition and Catalyst

The above zeolite B was treated with a $10^{-2}$ mol/l cationic solution of platinum complex $[(NH_3)_4PtCl_2]$ at 90° C. for 24 hours to subject the zeolite to ion exchange with Pt. Then, water washing was conducted five times with effecting vacuum filtration. The resulting filtrate was dried at 100° C. for 16 hours, followed by firing at 550° C. for 3 hours to obtain a Pt-ion exchanged zeolite powder. The zeolite had a Pt content of 0.83% by weight.

50 parts by weight of the Pt-ion exchanged zeolite powder was mixed with 40 parts by weight of commercially available $\gamma$-$Al_2O_3$ having a BET specific surface area of 200 $m^2/g$. Thereto was added a mixture of cerium acetate and a ceria powder in an amount of 10 parts by weight in terms of ceria. There were further added 150 parts by weight of water and acetic acid as a deflocculant. The resulting mixture was milled in a pot mill to obtain a slurry.

The slurry was coated on a cordierite honeycomb structure manufactured by NGK INSULATORS, LTD. [square cells, cell thickness of 6 mil (150 $\mu$m), cell density of 400 cells/$in^2$ (62 cells/$cm^2$)] in an amount of 30% by weight (110 g/l) per the unit weight of the honeycomb structure. The resulting honeycomb structure was dried at 120° C. for 2 hours and fired at 550° C. for 3 hours to obtain a sintered honeycomb structure.

An additional amount of Pt necessary to increase the total Pt amount loaded on the sintered honeycomb structure, to 30 g/$ft^3$ (1.06 g/l), was calculated from the Pt amount present in the ion-exchanged zeolite; and the sintered honeycomb structure was impregnated with an aqueous chloroplatinic acid solution (anionic type) containing a required amount of Pt, to load Pt on the γ-Al₂O₃-CeO₂ in the sintered honeycomb structure. The resulting honeycomb structure was dried at 120° C. for 2 hours and fired at 550° C. for 3 hours to obtain a catalyst ① comprising a monolith carrier, a zeolite component (a) and a heat-resistant oxide component (b), the components (a) and (b) being supported on the carrier.

For the catalyst ①, the components of the catalyst composition supported on the monolith carrier, the ratio of the components, etc. are shown in Table 2.

Catalysts ②, ③ and ④ were prepared in the same manner as above, using the zeolites C, D and E, respectively. The amounts of the catalyst composition of each catalyst, the ratio of the components, etc. are shown in Table 2.

COMPARATIVE EXAMPLE 1

A catalyst ㉒ was obtained in the same manner as in Example 1, except that commercially available zeolite A was used.

The components of the catalyst composition of the catalyst, the ratio of the components, etc. are shown in Table 2.

COMPARATIVE EXAMPLE 2

A catalyst ㉓ was obtained in the same manner as in Example 1, except that the sintered honeycomb structure was not impregnated with Pt and the structure itself was used as a catalyst.

A catalyst ㉔ was obtained in the same manner as in Example 1, except that a slurry comprising only the

TABLE 2

| | | (a) Zeolite subjected to ion exchange with platinum group metal(s) | | | | (b) Heat-resistant oxide | | | Catalyst | | |
|---|---|---|---|---|---|---|---|---|---|---|---|
| | Catalyst No. | Kind of Zeolite | Platinum group metal(s) | Ion exchange ratio (%) | Ratio of loading on honeycomb structure (wt %) | Kind of oxide | Platinum group metal(s) | Ratio of loading on honeycomb structure (wt %) | Weight ratio platinum group metal(s) loaded Pt/Pd/Rh | Amount of platinum group metal(s) loaded (g/ft³) | Type |
| Examples | | | | | | | | | | | |
| 1 | 1 | B | Pt | 25 | 50 | γ-Al₂O₃—CeO₂ | Pt | 50 | 1/0/0 | 30 | D[1] |
| | 2 | C | Pt | 70 | 50 | γ-Al₂O₃—CeO₂ | Pt | 50 | 1/0/0 | 30 | D[1] |
| | 3 | D | Pt | 78 | 50 | γ-Al₂O₃—CeO₂ | Pt | 50 | 1/0/0 | 30 | D[1] |
| | 4 | E | Pt | 82 | 50 | γ-Al₂O₃—CeO₂ | Pt | 50 | 1/0/0 | 30 | D[1] |
| 2 | 5 | C | Pt | 8 | 50 | γ-Al₂O₃—CeO₂ | Pt | 50 | 1/0/0 | 30 | D[1] |
| | 6 | C | Pt | 20 | 50 | γ-Al₂O₃—CeO₂ | Pt | 50 | 1/0/0 | 30 | D[1] |
| 3 | 7 | C | Pd | 86 | 50 | γ-Al₂O₃—CeO₂ | Pd | 50 | 0/1/0 | 30 | D[1] |
| | 8 | C | Rh | 67 | 50 | γ-Al₂O₃—CeO₂ | Rh | 50 | 0/0/1 | 30 | D[1] |
| | 9 | C | Pt | 70 | 50 | γ-Al₂O₃—CeO₂ | Pt/Rh | 50 | 5/0/1 | 30 | D[1] |
| | 10 | C | Pt | 70 | 50 | γ-Al₂O₃—CeO₂ | Pt/Rh | 50 | 19/0/1 | 30 | D[1] |
| | 11 | C | Pd | 86 | 50 | γ-Al₂O₃—CeO₂ | Pd/Rh | 50 | 0/19/1 | 30 | D[1] |
| | 12 | C | Rh | 67 | 50 | γ-Al₂O₃—CeO₂ | Pt | 50 | 5/0/1 | 30 | D[1] |
| | 13 | C | Rh | 21 | 50 | γ-Al₂O₃—CeO₂ | Pt | 50 | 19/0/1 | 30 | D[1] |
| | 14 | C | Pt/Rh | 70 | 50 | γ-Al₂O₃—CeO₂ | Pt/Rh | 50 | 19/0/1 | 30 | D[1] |
| | 15 | C | Pd/Rh | 86 | 50 | γ-Al₂O₃—CeO₂ | Pd/Rh | 50 | 0/19/1 | 30 | D[1] |
| 4 | 16 | C | Pd(Cu) | 90 | 50 | γ-Al₂O₃—CeO₂ | Pd | 50 | 0/1/0 | 25 | D[1] |
| 5 | 17 | C | Pt | 70 | 10 | γ-Al₂O₃—CeO₂ | Pt/Rh | 90 | 19/0/1 | 30 | D[1] |
| | 18 | C | Pt | 70 | 85 | γ-Al₂O₃—CeO₂ | Pt/Rh | 15 | 19/0/1 | 30 | D[1] |
| 6 | 19 | C | Rh | 21 | 50 | γ-Al₂O₃—CeO₂ | Pt | 50 | 19/0/1 | 30 | D[1] |
| | 20 | C | Rh | 21 | 50 | γ-Al₂O₃—CeO₂ | Pt | 50 | 19/0/1 | 30 | L[2] |
| | 21 | C | Rh | 21 | 50 | γ-Al₂O₃—CeO₂ | Pt | 50 | 19/0/1 | 30 | L[2] |
| Comparative Examples | | | | | | | | | | | |
| 1 | 22 | A | Pt | 10 | 50 | γ-Al₂O₃—CeO₂ | Pt | 50 | 1/0/0 | 30 | D[1] |
| 2 | 23 | B | Pt | 25 | 50 | γ-Al₂O₃—CeO₂ | — | 50 | 1/0/0 | 15 | D[1] |
| | 24 | B | Pt | 25 | 100 | — | — | 0 | 1/0/0 | 30 | D[1] |
| | 25 | B | — | — | 50 | γ-Al₂O₃—CeO₂ | Pt | 50 | 1/0/0 | 30 | D[1] |
| | 26 | B | — | 15[3] g/cm³ | 50 | γ-Al₂O₃—CeO₂ | Pt | 50 | 1/0/0 | 30 | D[1] |
| 3 | 27 | — | — | — | — | γ-Al₂O₃—CeO₂ | Pt | 100 | 1/0/0 | 30 | D[1] |
| | 28 | — | — | — | — | γ-Al₂O₃—CeO₂ | Pd | 100 | 0/1/0 | 30 | D[1] |
| | 29 | — | — | — | — | γ-Al₂O₃—CeO₂ | Pt/Rh | 100 | 5/0/1 | 35 | D[1] |
| | 30 | — | — | — | — | γ-Al₂O₃—CeO₂ | Pt/Rh | 100 | 19/0/1 | 30 | D[1] |

[1]Dispersion type,
[2]Layer type,
[3]Impregnation method

EXAMPLE 2

Catalysts ⑤ and ⑥ were obtained in the same manner in Example 1, except that zeolite C was used and the ion exchange efficiency was controlled at 8% and 20% by adjusting the ion exchange time, to obtain Pt-ion exchanged zeolite powders.

The components of the catalyst composition of each catalyst, the ratio of the components, etc. are shown in Table 2.

Pt-ion exchanged zeolite powder was coated on the cordierite honeycomb structure and the resulting sintered honeycomb structure was used as a catalyst.

A catalyst ㉕ was obtained in the same manner as in Example 1, except that zeolite B was used as it was, without being subjected to ion exchange with Pt.

Zeolite B was impregnated with Pt at normal temperature using an aqueous platinum chloride salt solution of anionic type; after filtration (water washing was not made), the resulting zeolite B was fired at 550° C. for 3 hours to obtain a powder of a zeolite containing Pt. A catalyst (26) was obtained in the same manner as in Example 1, except that the above powder of a zeolite containing Pt but not subjected to ion exchange was used.

The components of the catalyst composition of each catalyst, the ratio of the components, etc. are shown in Table 2.

COMPARATIVE EXAMPLE 3

A catalyst (27) was obtained in the same manner as in Example 1, except that the powder of an ion-exchanged zeolite was not used and only the heat-resistant oxide ($\gamma$-Al$_2$O$_3$) was used.

Catalysts (28), (29) and (30) were obtained in the same manner as above, except that the sintered honeycomb structure was impregnated with an aqueous solution containing platinum group metal(s) as shown in Table 2, to load the metal(s) on the structure.

The components of the catalyst composition of each catalyst, the ratio of the components, etc. are shown in Table 2.

EXAMPLE 3

Zeolite C was subjected to ion exchange with noble metal(s) as shown in Table 2, to prepare various ion-exchanged zeolite powders. These powders were subjected to the same treatment as in Example 1 to prepare various sintered honeycomb structures. Each of the honeycomb structures was impregnated with noble metal(s) as shown in Table 2, in the same manner as in Example 1 to obtain catalysts (7) to (15). Incidentally, in ion exchange, there were used (NH$_3$)$_4$PdCl$_2$ salt for Pd and (NH$_3$)$_6$RhCl$_3$ salt for Rh.

The components of the catalyst composition of each catalyst, the ratio of the components, etc. are shown in Table 2.

EXAMPLE 4

Zeolite C was subjected to ion exchange with Pd and further subjected to ion exchange with Cu using an aqueous copper acetate solution to obtain a zeolite powder of subjected to ion exchange with Pd and Cu. A catalyst (16) was obtained in the same manner as in the preparation of the catalyst (7) of Example 3, except that the above zeolite powder of a zeolite subjected to ion exchange with Pd and Cu was used.

The components of the catalyst composition of the catalyst 16, the ratio of the components, etc. are shown in Table 2.

EXAMPLE 5

Catalysts (17) and (18) were obtained in the same manner as in Example 1, except that zeolite C was used and the ratios of the Pt-ion exchanged zeolite powder and $\gamma$-Al$_2$O$_3$-CeO$_2$ were as shown in Table 2.

The components of the catalyst composition of each catalyst, the ratio of the components, etc. are shown in Table 2.

EXAMPLE 6

Zeolite C was used, and a Rh-ion exchanged zeolite powder was obtained in the same manner as in Example 3.

Separately, 80 parts by weight of $\gamma$-Al$_2$O$_3$ was mixed with 20 parts by weight (in terms of ceria) of cerium acetate and a ceria powder. Thereto were further added an aqueous chloroplatinic acid solution of anionic type and acetic acid. The mixture was milled in a pot mill to obtain a slurry. The slurry was dried at 120° C. for 16 hours and calcined at 550° C. for 3 hours to obtain Pt-containing $\gamma$-Al$_2$O$_3$-CeO$_2$, a noble metal-containing heat-resistant oxide.

50 parts by weight of the Rh-ion exchanged zeolite powder and 50 parts by weight of the Pt-containing $\gamma$-Al$_2$O$_3$-CeO$_2$ above-obtained were placed in a pot mill and wet-milled to obtain a slurry.

This slurry was coated on a cordierite honeycomb structure in the same manner as in Example 1. The resulting structure was dried at 120° C. for 2 hours and fired at 550° C. for 3 hours to obtain a sintered honeycomb structure, a catalyst (19).

A slurry of the above-obtained Rh-ion exchanged zeolite powder was coated on the same cordierite honeycomb structure in an amount of 15% by weight per unit weight of the structure. The coated structure was dried and fired in the same manner as above to obtain a sintered honeycomb structure loaded with a Rh-ion exchanged zeolite. This sintered honeycomb structure was further coated with 15% by weight, per the unit weight of the structure, of a slurry of the above-obtained Pt-containing $\gamma$-Al$_2$O$_3$-CeO$_2$. The coated structure was dried and fired in the same manner as above to obtain a catalyst (20) comprising a carrier, a catalyst component (a) and a catalyst component (b), the components (a) and (b) being supported on the carrier in this order in respective layers.

In the above, the order of coating the two slurries was reversed to obtain a catalyst (21) comprising a cordierite honeycomb structure, a Pt-containing $\gamma$-Al$_2$O$_3$-CeO$_2$ layer formed on the structure and a Rh-ion exchanged zeolite layer formed on the above layer.

The components of the catalyst composition of each catalyst, the ratio of the components, etc. are shown in Table 2.

EXAMPLE 7

Evaluation of Initial Performance of Catalyst

The above prepared catalysts (1) to (21) were measured for light-off performance, three-way characteristic and amount of NH$_3$ (by-product) generated, to evaluate the catalytic performance of each catalyst.

Light-off Performance

A simulated exhaust gas (a mixture gas) of A/F=14.6 was used; a catalyst was subjected to temperature elevation from 100° C. to 550° C. at a constant rate of 8° C./min; and the temperature at which the conversion of a particular gas component in the exhaust gas became 50% was taken as a light-off temperature T50% (°C.).

Three-Way Characteristic

There were measured conversion efficiencies of each gas component in the exhaust gas at a reaction temperature of 550° C. at three air-to-fuel ratios, i.e., A/F=14.0 [R (fuel-rich)], A/F=14.6 [S (fuel-stoichiometric)] and A/F=15.0 [L (fuel-lean)]. These conversion efficiency were taken as a three-way characteristic of the catalyst used.

Amount of NH$_3$ (By-Product) Generated

In the measurement of three-way characteristic, the exhaust gas was collected at two air-to-fuel ratios of A/F=14.5 [R (fuel-rich)] and A/F=14.6 [S (fuel-stoichiometric)], and the two exhaust gases were measured for $NH_3$ amount by a wet method (indophenol method, JIS K 0099).

Incidentally, the space velocity during measurement was always 50,000 $hr^{-1}$. The exhaust gas in the case of A/F=14.6 had a composition (by volume) of 1.7% (CO), 2,760 ppm (HC) (in terms of C), 950 ppm ($NO_x$), 1.3% ($O_2$), 0.6% ($H_2$), 13.2% ($CO_2$), 10.0% ($H_2O$), 23 ppm ($SO_2$) and the remainder ($N_2$).

The results are shown in Table 3.

for 60 seconds at an air-to-fuel ratio close to a stoichiometric point, so as to give a gas temperature of 750° C. at the catalyst bed inlet (catalyst bed temperature=about 800° C.), and then the fuel supply was stopped for 5 seconds to shift to a fuel-lean mixture. This cycle was repeated to subject each catalyst to total 100 hours of aging.

The resulting catalyst was measured for light-off performance, three-way property and amount of $NH_3$

TABLE 3

| | | Initial performance of catalyst | | | | | | | | | | | | |
|---|---|---|---|---|---|---|---|---|---|---|---|---|---|---|
| | | Light-off performance T50% (°C.) | | | Three-way characteristic conversion ratio (%) | | | | | | | | Amount of $NH_3$ generated (ppm) | |
| | | | | | CO | | | HC | | | $NO_x$ | | | |
| | Catalyst No. | CO | HC | $NO_x$ | (R) | (S) | (L) | (R) | (S) | (L) | (R) | (S) | (L) | (R) | (S) |
| Example 7 | 1 | 150 | 220 | 220 | 55.0 | 99.2 | 99.1 | 15.0 | 97.6 | 99.3 | 85.5 | 97.5 | 15.0 | 50 | 0 |
| | 2 | 155 | 220 | 220 | 54.3 | 99.5 | 99.5 | 16.5 | 97.5 | 99.2 | 88.8 | 97.4 | 15.5 | 40 | 0 |
| | 3 | 145 | 215 | 220 | 54.8 | 99.2 | 99.3 | 16.4 | 97.4 | 99.3 | 87.2 | 97.1 | 14.8 | 60 | 0 |
| | 4 | 170 | 250 | 250 | 50.8 | 99.4 | 99.4 | 15.1 | 97.3 | 99.1 | 84.8 | 96.6 | 14.2 | 70 | 0 |
| | 5 | 200 | 270 | 280 | 50.5 | 99.3 | 99.2 | 14.8 | 97.2 | 99.2 | 84.1 | 95.8 | 14.1 | 70 | 0 |
| | 6 | 160 | 240 | 235 | 52.8 | 99.2 | 99.3 | 15.8 | 96.8 | 99.1 | 87.4 | 97.3 | 14.8 | 50 | 0 |
| | 7 | 220 | 240 | 250 | 31.5 | 99.1 | 99.3 | 60.5 | 95.6 | 99.6 | 75.0 | 94.5 | 5.0 | 30 | 0 |
| | 8 | 150 | 200 | 200 | 59.8 | 99.4 | 99.6 | 62.4 | 97.3 | 99.5 | 99.5 | 99.8 | 25.0 | 20 | 0 |
| | 9 | 145 | 205 | 210 | 58.2 | 99.3 | 99.7 | 58.2 | 96.9 | 99.7 | 99.8 | 99.7 | 20.2 | 20 | 0 |
| | 10 | 160 | 210 | 220 | 55.4 | 99.4 | 99.6 | 54.8 | 96.8 | 99.5 | 98.4 | 99.4 | 18.1 | 30 | 0 |
| | 11 | 150 | 200 | 205 | 50.2 | 99.4 | 99.5 | 63.4 | 97.8 | 99.3 | 98.2 | 99.8 | 18.6 | 30 | 0 |
| | 12 | 140 | 195 | 200 | 58.2 | 99.4 | 99.6 | 61.8 | 97.4 | 99.5 | 99.8 | 99.8 | 24.3 | 20 | 0 |
| | 13 | 140 | 205 | 210 | 58.2 | 99.4 | 99.6 | 59.4 | 96.9 | 99.7 | 98.1 | 99.6 | 20.8 | 30 | 0 |
| | 14 | 145 | 205 | 210 | 56.4 | 99.5 | 99.6 | 58.5 | 97.3 | 99.5 | 98.2 | 99.8 | 20.1 | 30 | 0 |
| | 15 | 170 | 205 | 205 | 49.5 | 99.3 | 99.4 | 68.5 | 98.2 | 99.5 | 98.2 | 99.9 | 18.5 | 20 | 0 |
| | 16 | 230 | 245 | 250 | 33.5 | 99.1 | 99.3 | 62.1 | 95.8 | 99.5 | 78.0 | 94.3 | 6.2 | 30 | 0 |
| | 17 | 170 | 230 | 240 | 49.5 | 99.4 | 99.5 | 49.2 | 96.6 | 99.6 | 98.0 | 99.7 | 18.8 | 80 | 0 |
| | 18 | 160 | 215 | 220 | 56.4 | 99.4 | 99.6 | 56.2 | 97.1 | 99.5 | 98.5 | 99.5 | 18.3 | 30 | 0 |
| | 19 | 140 | 210 | 210 | 58.2 | 99.3 | 99.6 | 59.8 | 96.7 | 99.7 | 98.0 | 99.7 | 17.8 | 30 | 0 |
| | 20 | 140 | 200 | 200 | 54.8 | 99.4 | 99.6 | 58.0 | 96.9 | 99.6 | 98.1 | 99.7 | 16.8 | 30 | 0 |
| | 21 | 145 | 215 | 220 | 58.1 | 99.3 | 99.5 | 60.4 | 96.9 | 99.7 | 98.1 | 99.7 | 20.4 | 30 | 0 |
| Comparative | 22 | 150 | 225 | 220 | 45.7 | 99.2 | 99.1 | 11.4 | 97.6 | 99.2 | 82.5 | 96.0 | 8.1 | 70 | 0 |
| Example 4 | 23 | 350 | 390 | 390 | 45.3 | 99.2 | 99.3 | 13.2 | 97.4 | 99.1 | 80.3 | 94.8 | 9.2 | 50 | 0 |
| | 24 | 320 | 340 | 340 | 48.5 | 99.4 | 99.5 | 17.0 | 97.5 | 98.5 | 90.2 | 96.5 | 14.8 | 40 | 0 |
| | 25 | 170 | 250 | 250 | 45.7 | 99.2 | 99.3 | 11.4 | 97.6 | 99.2 | 35.4 | 95.1 | 7.1 | 300 | 15 |
| | 26 | 155 | 220 | 225 | 44.8 | 99.3 | 99.2 | 10.6 | 96.8 | 99.3 | 48.4 | 95.7 | 6.8 | 580 | 20 |
| | 27 | 150 | 240 | 230 | 50.2 | 99.4 | 99.4 | 10.8 | 96.6 | 99.5 | 54.7 | 96.5 | 7.0 | 600 | 20 |
| | 28 | 230 | 250 | 250 | 28.6 | 99.2 | 99.6 | 55.4 | 95.9 | 97.6 | 68.9 | 93.2 | 4.5 | 240 | 20 |
| | 29 | 150 | 215 | 215 | 57.0 | 99.3 | 99.3 | 46.4 | 94.2 | 99.6 | 94.5 | 99.7 | 19.2 | 30 | 0 |
| | 30 | 160 | 220 | 230 | 48.7 | 99.4 | 99.5 | 40.4 | 96.3 | 99.4 | 97.6 | 99.7 | 19.4 | 60 | 0 |

(R), (S) and (L) refer to measurements in a fuel-rich state, a fuel-stoichiometric state and a fuel-lean state, respectively.

Evaluation of Performance of Catalyst after Durability Test

There was used a 2,000 cc engine provided with one of the catalysts ① to ㉑. The engine was operated (by-product) generated, in the same manner as in the catalyst before durability test, to evaluate the catalytic performance of the catalyst after durability test.

The results are shown in Table 4.

TABLE 4

| | | Performance of catalyst after durability test | | | | | | | | | | | | |
|---|---|---|---|---|---|---|---|---|---|---|---|---|---|---|
| | | Light-off performance T50% (°C.) | | | Three-way characteristic conversion ratio (%) | | | | | | | | Amount of $NH_3$ generated (ppm) | |
| | | | | | CO | | | HC | | | $NO_x$ | | | |
| | Catalyst No. | CO | HC | $NO_x$ | (R) | (S) | (L) | (R) | (S) | (L) | (R) | (S) | (L) | (R) | (S) |
| Example 7 | 1 | 350 | 360 | 360 | 30.6 | 90.5 | 92.7 | 8.6 | 82.5 | 80.3 | 45.0 | 82.8 | 2.4 | 75 | 5 |
| | 2 | 330 | 340 | 340 | 35.2 | 91.5 | 94.2 | 10.2 | 84.4 | 85.1 | 46.0 | 87.3 | 2.8 | 50 | 5 |
| | 3 | 335 | 345 | 345 | 32.4 | 90.3 | 93.2 | 9.5 | 82.8 | 81.7 | 42.0 | 81.4 | 1.9 | 80 | 5 |
| | 4 | 350 | 365 | 365 | 30.1 | 88.2 | 91.0 | 8.2 | 80.3 | 80.5 | 41.0 | 80.2 | 1.5 | 90 | 5 |
| | 5 | 350 | 370 | 370 | 29.8 | 88.5 | 91.5 | 10.0 | 80.5 | 80.7 | 40.8 | 80.4 | 1.6 | 95 | 5 |
| | 6 | 335 | 345 | 345 | 34.3 | 90.8 | 93.4 | 8.5 | 83.8 | 84.2 | 42.8 | 84.8 | 2.7 | 60 | 5 |
| | 7 | 280 | 345 | 370 | 25.0 | 98.1 | 99.1 | 38.1 | 86.7 | 80.1 | 15.0 | 80.3 | 2.7 | 100 | 5 |
| | 8 | 240 | 295 | 295 | 44.4 | 99.2 | 99.5 | 47.4 | 97.1 | 98.4 | 98.8 | 99.5 | 22.8 | 30 | 0 |
| | 9 | 250 | 300 | 295 | 40.9 | 99.2 | 99.4 | 44.4 | 96.8 | 97.8 | 81.8 | 94.1 | 18.5 | 40 | 0 |
| | 10 | 315 | 320 | 320 | 39.5 | 99.3 | 99.4 | 42.4 | 96.5 | 97.4 | 79.5 | 88.5 | 17.4 | 70 | 5 |
| | 11 | 310 | 310 | 310 | 38.5 | 99.2 | 99.4 | 46.2 | 96.5 | 97.7 | 78.5 | 88.2 | 16.3 | 70 | 5 |
| | 12 | 240 | 290 | 290 | 45.4 | 99.3 | 99.5 | 48.4 | 96.8 | 97.3 | 98.4 | 98.1 | 24.0 | 30 | 0 |
| | 13 | 300 | 310 | 315 | 40.8 | 99.2 | 99.5 | 43.8 | 96.2 | 96.5 | 80.8 | 92.1 | 19.4 | 60 | 0 |
| | 14 | 305 | 315 | 315 | 42.8 | 99.3 | 99.5 | 45.4 | 96.8 | 96.5 | 80.2 | 91.8 | 18.2 | 60 | 0 |
| | 15 | 300 | 310 | 315 | 41.5 | 99.2 | 99.5 | 50.4 | 96.5 | 97.2 | 78.0 | 90.5 | 15.8 | 60 | 0 |

TABLE 4-continued

| | | Performance of catalyst after durability test | | | | | | | | | | | | |
|---|---|---|---|---|---|---|---|---|---|---|---|---|---|---|
| | | Light-off performance T50% (°C.) | | | Three-way characteristic conversion ratio (%) | | | | | | | | Amount of NH3 generated (ppm) | |
| | | | | | CO | | | HC | | | NOx | | | |
| | Catalyst No. | CO | HC | NOx | (R) | (S) | (L) | (R) | (S) | (L) | (R) | (S) | (L) | (R) | (S) |
| 16 | | 285 | 350 | 370 | 24.8 | 98.8 | 99.0 | 38.3 | 85.8 | 84.2 | 14.8 | 82.1 | 2.7 | 80 | 0 |
| 17 | | 340 | 360 | 370 | 36.1 | 99.2 | 99.3 | 41.4 | 96.3 | 97.2 | 75.0 | 80.5 | 17.4 | 90 | 10 |
| 18 | | 320 | 330 | 330 | 39.2 | 99.3 | 99.4 | 47.2 | 96.4 | 97.5 | 79.2 | 85.8 | 18.1 | 60 | 5 |
| 19 | | 290 | 300 | 310 | 42.8 | 99.3 | 99.5 | 45.7 | 96.8 | 97.2 | 81.8 | 92.4 | 19.4 | 45 | 0 |
| 20 | | 290 | 295 | 300 | 41.4 | 99.1 | 99.5 | 44.2 | 96.3 | 97.4 | 80.8 | 87.8 | 17.5 | 50 | 0 |
| 21 | | 300 | 310 | 315 | 42.1 | 99.2 | 99.4 | 47.8 | 96.4 | 97.4 | 82.4 | 92.6 | 18.4 | 40 | 0 |
| Comparative | 22 | 420 | 430 | 430 | 21.5 | 78.5 | 91.5 | 8.1 | 39.5 | 75.5 | 19.5 | 27.5 | 0.5 | 350 | 10 |
| Exampl 4 | 23 | 420 | 450 | 455 | 20.8 | 77.4 | 90.8 | 6.4 | 72.4 | 78.3 | 38.3 | 85.0 | 1.9 | 80 | 5 |
| 24 | | 355 | 365 | 365 | 30.0 | 90.7 | 91.3 | 7.5 | 84.2 | 80.2 | 45.2 | 82.9 | 2.5 | 60 | 5 |
| 25 | | 470 | 470 | 490 | 18.7 | 40.8 | 93.5 | 3.1 | 16.8 | 85.8 | 3.2 | 5.3 | 1.7 | 60 | 30 |
| 26 | | 410 | 430 | 430 | 18.4 | 47.5 | 90.3 | 4.1 | 17.8 | 76.5 | 3.1 | 14.3 | 0.6 | 140 | 20 |
| 27 | | 420 | 425 | 435 | 21.4 | 91.5 | 92.5 | 4.1 | 80.7 | 80.8 | 2.1 | 30.5 | 0.5 | 250 | 35 |
| 28 | | 300 | 370 | 390 | 16.3 | 97.2 | 90.5 | 35.5 | 90.4 | 69.5 | 9.3 | 24.0 | 0.9 | 280 | 30 |
| 29 | | 315 | 325 | 300 | 34.0 | 98.8 | 99.5 | 28.6 | 97.4 | 93.6 | 62.8 | 82.8 | 5.4 | 70 | 10 |
| 30 | | 340 | 370 | 380 | 35.8 | 99.3 | 99.3 | 38.9 | 95.9 | 96.1 | 74.0 | 75.0 | 18.4 | 120 | 20 |

(R), (S) and (L) refer to measurements in a fuel-rich state, a fuel-stoichiometric state and a fuel-lean state, respectively.

COMPARATIVE EXAMPLE 4

The catalysts (22) to (30) were measured for initial performance and performance after durability test, in the same manner as in Example 7. The initial performance and the performance after durability test are shown in Table 3 and Table 4, respectively.

What is claimed is:

1. A catalyst composition for purification of exhaust gas, comprising:
   (a) high-silica zeolite having a Si/Al ratio of 40 or more, subjected to ion exchange with at least one metal selected from the group consisting of Pt, Pd, Rh, Ir and Ru; and
   (b) a heat-resistant oxide comprising (i) at least one oxide selected from the group consisting of $Al_2O_3$, $TiO_2$, $ZrO_2$, $SiO_2$, their compound oxides and mixtures of said oxide with a rare earth element compound oxide and/or an alkaline earth metal compound oxide, and (ii) at least one metal selected from the group consisting of Pt, Pd, Rh, Ir and Ru.

2. A catalyst for purification of exhaust gas, comprising:
   (a) high-silica zeolite having a Si/Al ratio of 40 or more, subjected to ion exchange with at least one metal selected from Pt, Pd, Rh, Ir and Ru;
   (b) a heat-resistant oxide comprising (i) at least one oxide selected from the group consisting of $Al_2O_3$, $TiO_2$, $ZrO_2$, $SiO_2$, their compound oxides and mixtures of said oxide with a rare earth element compound oxide and/or an alkaline earth metal compound oxide, and (ii) at least one metal selected from the group consisting of Pt, Pd, Rh, Ir and Ru; and
   (c) a monolith carrier supporting the components (a) and 3. A catalyst for purification of exhaust gas according to claim 2, wherein the monolith carrier is made of a ceramic or metallic material.

4. A catalyst for purification of exhaust gas according to claim 2, wherein the components (a) and (b) are supported substantially uniformly.

5. A catalyst for purification of exhaust gas according to claim 2, wherein the components (a) and (b) are supported on the carrier in the form of respective layers.

6. A catalyst for purification of exhaust gas according to claim 5, wherein the component (a) is a first layer formed on the carrier and the component (b) is a second layer formed on the first layer.

7. A catalyst for purification of exhaust gas according to claim 5, wherein the component (b) is a first layer formed on the carrier and the component (a) is a second layer formed on the first layer.

8. A process for producing a catalyst for purification of exhaust gas, which comprises:
   coating a monolith carrier with a slurry comprising high-silica zeolite having a Si/Al ratio of 40 or more, subjected to ion exchange with at least one metal selected from the group consisting of Pt, Pd, Rh, Ir and Ru, and a heat-resistant oxide or its precursor;
   drying and/or firing the slurry-coated monolith carrier;
   impregnating the resulting monolith carrier with a solution containing at least one metal selected from the group consisting of Pt, Pd, Rh, Ir and Ru; and
   drying and/or firing the impregnated monolith carrier.

9. A process for producing a catalyst for purification of exhaust gas according to claim 8, wherein the heat-resistant oxide is at least one oxide selected from the group consisting of $Al_2O_3$, $TiO_2$, $ZrO_2$, $SiO_2$, their compound oxides and mixtures of said oxide with a rare earth element (compound) oxide and/or an alkaline earth metal (compound) oxide.

10. A process for producing a catalyst for purification of exhaust gas, which comprises:
    coating a monolith carrier with a slurry comprising high-silica zeolite having a Si/Al ratio of 40 or more, subjected to ion exchange with at least one metal selected from the group consisting of Pt, Pd, Rh, Ir and Ru, and a heat-resistant oxide or its precursor containing at least one metal selected from the group consisting of Pt, Rh, Ir and Ru; and
    drying and/or firing the slurry-coated monolith carrier.

11. A process for producing a catalyst for purification of exhaust gas according to claim 10, wherein the heat-resistant oxide is at least one oxide selected from the group consisting of $Al_2O_3$, $TiO_2$, $ZrO_2$, $SiO_2$, their compound oxides and mixtures of said oxide with a rare earth element (compound) oxide and/or an alkaline earth metal (compound) oxide.

12. A process for producing a catalyst for purification of exhaust gas, which comprises conducting, at least once, a series of steps comprising:
  (i) a first slurry-adhering step wherein a monolith carrier is coated with a slurry comprising a high-silica zeolite having a Si/Al ratio of 40 or more, or its precursor;
  (ii) an ion exchange step wherein the monolith carrier after the first slurry-coating step is dried and/or fired, or hydrothermally synthesized and dried and/or fired, and then contacted with a solution containing at least one metal selected from the group consisting of Pt, Pd, Rh, Ir and Ru to subject the high-silica zeolite to ion exchange with said metal;
  (iii) a second slurry-coating step wherein the monolith carrier after the ion exchange step is coated with a slurry comprising a heat-resistant oxide or its precursor; and
  (iv) a metal-supporting step wherein the monolith carrier after the second slurry-coating step is dried and/or fired and then impregnated with a solution containing at least one metal selected from the group consisting of Pt, Pd, Rh, Ir and Ru, to allow said metal to be supported on the monolith carrier, and then drying and/or firing the resulting catalyst.

13. A process for producing a catalyst for purification of exhaust gas according to claim 12, wherein the heat-resistant oxide is at least one oxide selected from the group consisting of $Al_2O_3$, $TiO_2$, $ZrO_2$, $SiO_2$, their compound oxides and mixtures of said oxide with a rare earth element (compound) oxide and/or an alkaline earth metal (compound) oxide.

14. A process for producing a catalyst for purification of exhaust gas, which comprises conducting, at least once, a treatment comprising:
  (i) a step wherein a monolith carrier is coated with a slurry comprising a heat-resistant oxide or its precursor, the slurry-coated monolith carrier is dried and/or fired and then impregnated with a solution containing at least one metal selected from the group consisting of Pt, Pd, Rh, Ir and Ru, and the impregnated monolith carrier is dried and/or fired, or wherein a monolith carrier is coated with a slurry comprising a heat-resistant oxide or its precursor containing at least one metal selected from the group consisting of Pt, Pd, Rh, Ir and Ru, and the slurry-coated monolith carrier is dried and/or fired; and
  (ii) a step wherein the resulting monolith carrier is coated with a slurry comprising a high-silica zeolite having a Si/Al ratio of 40 or more, subjected to ion exchange with at least one metal selected from the group consisting of Pt, Pd, Rh, Ir and Ru, and the slurry-coated monolith carrier is dried and/or fired.

15. A process for producing a catalyst for purification of exhaust gas according to claim 14, wherein the heat-resistant oxide is at least one oxide selected from the group consisting of $Al_2O_3$, $TiO_2$, $ZrO_2$, $SiO_2$, their compound oxides and mixtures of said oxide with a rare earth element (compound) oxide and/or an alkaline earth metal (compound) oxide.

16. A catalyst for purification of exhaust gas according to claim 1, wherein the Si/Al ratio is not less than 130.

* * * * *